US012035109B2

(12) United States Patent
Ruaro et al.

(10) Patent No.: US 12,035,109 B2
(45) Date of Patent: Jul. 9, 2024

(54) HEARING DEVICE HAVING A MAGNETIC INDUCTION COIL

(71) Applicant: GN Hearing A/S, Ballerup (DK)

(72) Inventors: Andrea Ruaro, Ballerup (DK); Sinasi Özden, Ballerup (DK)

(73) Assignee: GN HEARING A/S, Ballerup (DK)

( * ) Notice: Subject to any disclaimer, the term of this patent is extended or adjusted under 35 U.S.C. 154(b) by 193 days.

(21) Appl. No.: 17/693,286

(22) PCT Filed: Oct. 6, 2020

(86) PCT No.: PCT/EP2020/077985
§ 371 (c)(1),
(2) Date: Mar. 11, 2022

(87) PCT Pub. No.: WO2021/069434
PCT Pub. Date: Apr. 15, 2021

(65) Prior Publication Data

US 2023/0028379 A1 Jan. 26, 2023

(30) Foreign Application Priority Data

Oct. 11, 2019 (EP) ..................................... 19202764

(51) Int. Cl.
*H04R 25/00* (2006.01)

(52) U.S. Cl.
CPC ..... *H04R 25/554* (2013.01); *H04R 2225/021* (2013.01); *H04R 2225/51* (2013.01)

(58) Field of Classification Search
CPC .. H04R 25/554; H04R 25/556; H04R 25/607; H04R 25/609; H04R 2225/57; H04R 2225/51
See application file for complete search history.

(56) References Cited

U.S. PATENT DOCUMENTS 6,269,266 B1 * 7/2001 Leysieffer ............ H04R 25/554 607/2
6,748,094 B1 * 6/2004 Tziviskos ............ H04R 25/607 381/322

(Continued)

FOREIGN PATENT DOCUMENTS

EP 2140908 A2 * 1/2010 ......... A61N 1/36032
EP 3101917 12/2016

(Continued)

OTHER PUBLICATIONS

Extended European Search Report for EP Patent Appln. No. 19202764.7 dated Dec. 19, 2019.

(Continued)

*Primary Examiner* — Ryan Robinson
(74) *Attorney, Agent, or Firm* — Vista IP Law Group, LLP

(57) ABSTRACT

The disclosure relates to a hearing device comprising a magnetic induction coil, a magnetic induction control unit interconnected with the magnetic induction coil. The magnetic induction control unit and the magnetic induction coil being configured for wireless communication. The hearing device comprises a behind-the-ear housing module, the behind-the-ear housing module comprising a signal processor for processing received audio signals into a signal modified to compensate for a user's hearing impairment, a connecting module configured for providing the modified signal to an ear of the user, a coupling module interconnecting the behind-the-ear housing module and the connecting module. The magnetic induction control unit is provided in the behind-the-ear housing module, and the magnetic induction coil is provided in the coupling module.

17 Claims, 7 Drawing Sheets

(56) References Cited

U.S. PATENT DOCUMENTS

Figure 1:
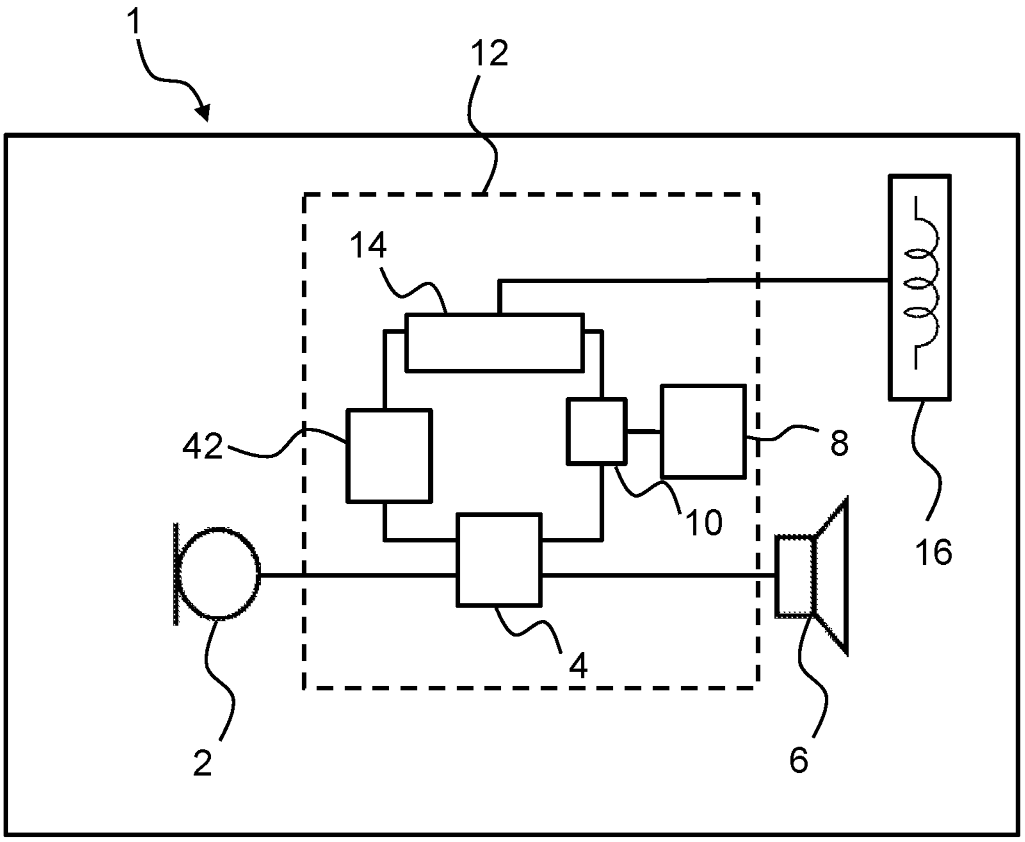

| | | | | |
|---|---|---|---|---|
| 7,548,211 | B2 * | 6/2009 | Platz | H01Q 1/273 343/866 |
| 8,422,705 | B2 * | 4/2013 | Kilsgaard | H04R 25/70 381/314 |
| 8,526,879 | B2 * | 9/2013 | Kristiansen | H04M 1/6033 455/100 |
| 8,660,285 | B2 * | 2/2014 | Karunasiri | H04R 25/554 381/322 |
| 8,855,348 | B2 * | 10/2014 | Johnson | H04R 25/554 381/331 |
| 9,319,807 | B2 * | 4/2016 | Meskens | A61N 1/37223 |
| 9,521,494 | B2 * | 12/2016 | Nikles | H04R 25/554 |
| 10,021,495 | B2 * | 7/2018 | Vonlanthen | H04R 25/652 |
| 10,028,066 | B2 * | 7/2018 | Schmidt | H04R 25/305 |
| 10,219,084 | B2 * | 2/2019 | Meskens | H04R 25/554 |
| 10,264,369 | B2 * | 4/2019 | Bodvarsson | H04R 25/554 |
| 10,582,317 | B2 * | 3/2020 | Troelsen | H04R 25/554 |
| 11,012,794 | B2 * | 5/2021 | Sundberg | H01Q 1/2291 |
| 2003/0031339 | A1 * | 2/2003 | Marshall | H01Q 1/526 381/406 |
| 2009/0285437 | A1 * | 11/2009 | Takigawa | H04R 1/1041 381/380 |
| 2013/0223664 | A1 | 8/2013 | Meskens et al. | |
| 2013/0343584 | A1 | 12/2013 | Bennett et al. | |
| 2017/0188163 | A1 * | 6/2017 | Rabel | H04R 25/55 |
| 2021/0268281 | A1 * | 9/2021 | Johansson | A61N 1/3787 |

FOREIGN PATENT DOCUMENTS

| | | | | |
|---|---|---|---|---|
| EP | 3343953 | | 7/2018 | |
| WO | WO-2019076382 | A1 * | 4/2019 | H01R 24/58 |

OTHER PUBLICATIONS

PCT International Search Report and Written Opinion for International Appln. No. PCT/EP2020/077985 dated Dec. 4, 2020.

International Preliminary Report on Patentability for International Appln. No. PCT/EP2020/077985 dated Apr. 12, 2022.

* cited by examiner

HEARING DEVICE HAVING A MAGNETIC INDUCTION COIL

RELATED APPLICATION DATA

This application is the national stage of International Patent Application No. PCT/EP2020/077985 filed on Oct. 6, 2020, which claims priority to, and the benefit of, European patent application No. 19202764.7 filed on Oct. 11, 2019. The entire disclosures of the above applications are expressly incorporated by reference herein.

FIELD

The present disclosure relates to hearing devices and methods therefore, particularly hearing devices having wireless communication capabilities and thus hearing devices comprising antennas for communication.

The present disclosure further relates to a hearing device configured to communicate using magnetic induction and/or to communicate through the use of radio frequencies. The hearing device may be used in a binaural hearing device system. The hearing device may be hearing devices for compensating a hearing loss of a user. During operation, the hearing device is worn in or at the ear of a user, such as for alleviating a hearing loss of the user.

BACKGROUND

Hearing devices are very small and delicate devices and comprise many electronic and metallic components contained in a housing or shell small enough to fit in the ear canal of a human or be located behind the outer ear. The many electronic and metallic components in combination with the small size of the hearing device housing or shell impose high design constraints on antennas to be used in hearing devices with wireless communication capabilities, both MI antennas and RF antennas.

Moreover, particularly antennas in hearing devices must be designed to achieve a satisfactory performance despite these limitations and other narrow design constraints imposed by the size of the hearing device and the proximity to a user's head.

The developments within wireless technologies in general have led to even higher expectations of the communication capabilities of the hearing devices, despite a concurrent continuous efforts to make hearing devices smaller and more cost effective to manufacture.

Still further, in binaural hearing device systems, the requirements to the quality of the communication between the hearing devices in the binaural hearing device system are ever increasing, and so is the requirements for communication between the hearing device and other electronic devices, such as smart phones, accessory devices, etc., and include demands for low latency and low noise, increasing the requests for effective antennas in the hearing devices.

Therefore, there is a need for an improved design of hearing devices providing communication with other hearing devices or electronic devices.

SUMMARY

In accordance with the present disclosure, one or more of the above-mentioned and other objects are obtained by the disclosed hearing device.

According to a first aspect there is provided a hearing device comprising a magnetic induction coil and a magnetic induction control unit interconnected with the magnetic induction coil. The magnetic induction control unit and the magnetic induction coil are being configured for wireless communication. The hearing device further comprises a behind-the-ear housing module. The behind-the-ear housing module may for example comprise a signal processor for processing received audio signals into a signal modified to compensate for a user's hearing impairment. The hearing device further comprises a connecting module configured for providing the modified signal to an ear of the user, a coupling module interconnecting the behind-the-ear housing module and the connecting module. The magnetic induction control unit is provided in the behind-the-ear housing module, and the magnetic induction coil is provided in the coupling module.

Magnetic induction, or near-field magnetic induction (NFMI), typically provides communication, including transmission of voice, audio and data, in a range of frequencies between 2 MHz and 30 MHz. At these frequencies the electromagnetic radiation propagates through and around the human head and body without significant losses in the tissue. The magnetic induction antenna operating at such frequencies could be susceptible to noise originating from the hearing device electric components.

In some examples, noise in the micro-volt range may be sufficient to influence the operation of the magnetic induction coil, and in some examples the magnetic induction coil may have a noise floor below 50 μV.

In some prior art examples, the magnetic induction coil has been provided shielded by the battery, however, as more hearing devices are provided with rechargeable batteries, it has been found by the present inventors that a position behind the battery is not offering sufficient shielding. It has however been found that by providing the magnetic induction control unit and the signal processor in the behind-the-ear housing module while providing the magnetic induction coil in the coupling module interconnecting the behind-the-ear housing module and the connecting module may reduce the noise level at the position of the magnetic induction coil sufficiently.

In some embodiments, the coupling module interconnecting the behind-the-ear housing module and the connecting module comprises a first coupling part and a second coupling part, the first coupling part being attached to the behind-the-ear housing module, and the second coupling part being attached to the connecting module; the first coupling part and the second coupling part being configured to be detachably connected.

It is an advantage of having a detachable connection between the first coupling part and the second coupling part that the connecting module may be fitted to the user, replaced to obtain a proper fit, or detached e.g. for cleaning or replacement with limited efforts and with minimised interference with the behind-the-ear housing module as such.

In some embodiments, the magnetic induction coil is provided in the first coupling part.

It is an advantage of having the magnetic induction coil provided in the first coupling part in that the first coupling part is not replaced when the connecting part is replaced, thus, the connecting part can be made cheaper, and readily available to a user, even when the magnetic induction coil is provided in the coupling module.

The hearing device typically comprises a first transducer, such as a microphone to generate one or more microphone output signals based on a received audio signal. The one or more microphone output signals are provided to the signal processor for processing the one or more microphone output signals. A receiver or speaker is connected to an output of the signal processor, for example for converting the output of the signal processor into a signal modified to compensate for a user's hearing impairment, and provides the modified signal to the speaker.

The signal processor may comprise elements such as an amplifier, a compressor and/or a noise reduction system etc. The signal processor device may further have a filter function, such as compensation filter for optimizing the output signal.

In some embodiments the magnetic induction control unit implements magnetic induction transmit and receive functions, such as magnetic induction transmit and receive control functions. The magnetic induction control unit is interconnected to the magnetic induction coil e.g. via electrical wires or via electrical conductive traces on a support substrate, such as e.g. PCB or similar, such as a flexible foil, such as a flexible PCB. The hearing device comprising the magnetic induction control unit and the magnetic induction coil is configured to communicate using magnetic induction, such as near-field magnetic induction. The magnetic induction coil may also be referred to as a magnetic induction antenna. The magnetic induction control unit may also be referred to as a wireless communication unit. The magnetic induction control unit may be configured for communication using any protocol as known for a person skilled in the art. In some embodiments, the magnetic induction coil and the magnetic induction control chip are configured for bi-directional communication. The magnetic induction control unit may be configured to control power supply to the magnetic induction coil.

In some embodiments, the magnetic induction control unit is configured to apply any modulation schemes including amplitude modulation, phase modulation, and/or frequency modulation to the data signal to be communicated via magnetic induction so that data are modulated onto the magnetic field emitted from the magnetic induction coil. The magnetic induction control unit may comprise circuits, such as low noise amplifiers (LNA), mixers and filters. The magnetic induction control unit may also comprise peripheral digital blocks such as frequency dividers, codec blocks, demodulators, etc.

In some embodiments, the magnetic induction coil is furthermore configured for receiving a magnetic field communicated by another electronic device, such as via a magnetic induction coil or antenna of another electronic device, and providing the received data signal to the magnetic induction control unit. The magnetic induction control unit is configured to demodulate the received signal. In some embodiments, the magnetic induction control unit is configured as a transceiver. In some embodiments, the magnetic induction control unit is configured to receive and transmit data at a particular frequency.

The data communicated may include data, audio, voice, settings, information, etc.

The magnetic induction coil and the magnetic induction control unit may be configured to operate at a frequency below 100 MHz, such as at below 30 MHz, such as below 15 MHz, during use. The magnetic induction antenna may be configured to operate at a frequency range between 1 MHz and 100 MHz, such as between 1 MHz and 15 MHz, such as between 1 MHz and 30 MHz, such as between 5 MHz and 30 MHz, such as between 5 MHz and 15 MHz, such as between 10 MHz and 11 MHz, such as between 10.2 MHz and 11 MHz. The frequency may further include a range from 2 MHz to 30 MHz, such as from 2 MHz to 10 MHz, such as from 2 MHz to 10 MHz, such as from 5 MHz to 10 MHz, such as from 5 MHz to 7 MHz.

However, it is envisaged that the hearing device as herein disclosed is not limited to operation in such a frequency band, and the hearing device may be configured for operation in any frequency band.

In some embodiments, the impedance of the magnetic induction coil is selected to optimize communication. The magnetic induction coil may in some examples have an impedance larger than a threshold inductance, such as an inductance larger than 2 pH, such as an inductance larger than 3 pH, such as larger than 3.5 pH, such as about 3.9 pH or an inductance of up to 5 pH. The inductance may be selected to be between 2 pH and 5 pH, such as between 3 pH and 4 pH.

In some embodiments, the magnetic induction coil has a longitudinal direction being parallel to an ear-to-ear axis of a user of the hearing device, when the hearing device is provided in the intended operational position at the ear of a user, the longitudinal direction may be the axis along which axis coil windings of the magnetic induction coil are provided. In one or more embodiments, the magnetic induction coil has a longitudinal extension in a direction being parallel to, or being substantially parallel to, or being 0/180 degrees+/−35 degrees, to an ear-to-ear axis of a user, when the hearing device is worn in its operational position during use.

In some embodiments, a support substrate such as a printed circuit board is provided in the coupling module, such as in the first part of the coupling module. In some embodiments, the magnetic induction coil is mounted on the substrate in the coupling module. Hereby, the orientation of the magnetic induction coil may be arranged in accordance with the above.

In some embodiments, the hearing device further comprises an in-the-ear module, the in-the-ear module being configured to be positioned in the ear of a user to receive the modified signal from the signal processor via the coupling module and the connecting module, and provide the modified signal to the ear of a user. The in-the-ear module is attached to the connecting module. The in-the-ear module is attached to the connecting module opposite the coupling module.

In some embodiments, the in-the-ear module comprises at least one electrical component, such as a transducer; the at least one electrical component having an electrical interconnection with electrical components, such as any one or more of the signal processor, the battery, etc. of the behind-the-ear housing module. The at least one electrical component may comprise a transducer. In some embodiments, the in-the-ear module comprises an ear-mold with no electrical parts.

In some embodiments, the connecting module is configured to provide the modified signal from the signal processor to an ear of a user using an electrical interconnection. The connecting module may comprise an electrical interconnection, such as a wire, a cable, etc. In some embodiments, the connecting module is configured to provide the modified signal to an ear of a user through a sound tube so that the connecting module comprises a sound tube. In some embodiments, the connecting module is configured as an ear hook so that the connecting module comprises an ear hook. The ear hook may furthermore be configured as a sound tube. In some embodiments one or more microphones may be provided in the ear of a user, and the connecting module may comprise one or more microphone signal lines connecting the one or more microphones provided in the ear to at least the signal processor in the behind-the-ear housing module.

In some embodiments, the electrical interconnection is provided through the connecting module and through the coupling module to the electrical components of the behind-the-ear housing module from the in-the-ear module, such as from the at least one electrical component of the in-the-ear module, such as from one or more transducers in the in-the-ear module. The electrical components of the in-the-ear module may comprise one or more transducers.

In some embodiments, at least one electrical interconnection is provided between the behind-the-ear housing module and the in-the-ear module, for example from electrical components, such as any one or more of the signal processor, the battery, etc. of the behind-the-ear housing module to the at least one electrical component, such as to the at least one transducer, in the in-the-ear module. Thus, hereby, at least one electrical interconnection carrying an electrical signal proceeds from the behind-the-ear housing module through the coupling module to the connecting module. However, such an electrical interconnection may induce electromagnetic noise along the electrical interconnection, e.g. due to electromagnetic interference. Such electromagnetic noise may be a disadvantage, particularly as such an electrical interconnection inherently will be provided in proximity to the magnetic induction coil in the coupling module.

It should be noted that the hearing device as such is of a small size so that the behind-the-ear housing module is able to fit behind the outer ear of a user, and certainly also the coupling device, coupling the behind-the-ear housing module to the connecting module is of a small size, and configured to be as imperceptible as possible, to ensure that the overall impression of the hearing device maintains a small size to be as un-noticeable to the user as possible. Therefore, the components in the coupling module will be provided in proximity to one another.

In some embodiments, the electrical interconnection may be insulated; however, typically, such insulation, to be sufficient for efficiently shielding any electromagnetic noise, would increase the diameter of the electrical interconnection more than desired for a hearing device use.

In some embodiments, a filter is provided in the behind-the-ear housing module, the filter being configured to filter signals transmitted by the electrical interconnection between electrical components of the behind-the-ear housing module and the at least one electrical component of the in-the-ear module. In some embodiment, the filter is configured to filter the modified signal to be provided to the at least one electrical component of the in-the-ear module.

The filter may be implemented as a part of the signal processor, or the filter may be implemented as a separate electric circuit.

It is an advantage of providing a filter, such as a filtering element, configured to filter signals transmitted by the electrical interconnection between electrical components of the behind-the-ear housing module and the at least one electrical component of the in-the-ear module that e.g. particular frequencies may be filtered out before the electrical signals passes through the coupling module.

In some embodiments, the filter is a low-pass filter; such as a low pass filter having a cut-off frequency at or below 1 MHz, such as at or below 5 MHz, such as at or below 8 MHz. Typically, the electrically interconnection carries transducer signals, such a microphone signal, such as speaker signal, such as audio signals, etc. Typically, such signals have a frequency which is lower than 8 MHz, such as lower than 5 MHz, such as lower than 1 MHz, so that the filter will allow passage of such transducer signals, however, will reduce or filter out signals having frequencies above such frequencies, including in particular harmonics of any transducer signals having frequencies above 1 MHz, such as above 5 MHz, such as above 8 MHz.

In some embodiments, the filter is a band pass filter configured to filter out a frequency range around an operational frequency of the magnetic induction coil. Hereby, signals having a frequency below such range or above such magnetic induction coil operational range would not be reduced or eliminated by such band pass filter; however any signals having a frequency falling within the magnetic induction coil operational range, would be reduced or eliminated by the filter. Thus, the electrical interconnection would then not, or substantially not, conduct signals having a frequency within the magnetic induction coil operational range.

In some embodiments, the electrical interconnection comprises an H-bridge circuit, the H-bridge circuit being provided in the behind-the-ear housing module between the signal processor and the filter. The H-bridge circuit is being configured to receive the signal processed to compensate a hearing loss of a user, and generate a pulse-width-modulated modified signal having a rise time and a fall time. In some embodiments, the H-bridge circuit is configured to amplify the modified signal before the modified signal is provided to the in-the-ear module via the coupling module and the connecting module.

The pulse-width modulated modified signal is provided to the filter. The filter is configured to increase the rise time and the fall time of the pulse-width-modulated signal. In some embodiments, the pulse-width-modulated modified signal is the modified signal to be provided to the ear of a user.

In some embodiments, the H-bridge circuit is provided as part of the signal processor; however, it is envisaged that the H-bridge circuit may also be implemented as a separate electric circuit.

The pulse-width modulated modified signal may have a frequency between 0 Hz and 20 kHz, such as between 100 Hz and 1 kHz, such as between 200 Hz and 500 Hz.

In some embodiments, the pulse-width-modulated signal of the H-bridge is configured to have a pulse rise time and a pulse fall time which is very steep, and may be in the order of 1 ns. In some embodiments such a short fall/rise time may be advantageous. In some embodiments however, such short fall/rise times may induce a noise signal.

In some embodiments, the pulse-width-modulated signal is filtered by the filter. In some embodiments, the rise/fall time of the pulse-width-modulated signal is increased by 20%, such as by 50% by the filter. In some embodiments, the rise/fall time of the pulse-width-modulated signal is increased by an order of magnitude. For example, the pulse-width-modulated signal from the H-bridge may have a rise/fall time of about 1 ns and the filter may increase the rise/fall time to e.g. 10 ns. In some embodiments, the RC factor of the filter is configured to obtain a smoothening of the pulse-width modulated signal, for example so as to obtain a desired increase of the rise/fall time for the pulse-width-modulated signal. In some embodiments, the filter is configured to have an RC factor which is between 10 and 200.

It is an advantage of using the filter to increase the rise/fall time of the pulse-width modulated signal in that the noise induced in the electrical interconnection may thereby be reduced. In some embodiments, by smoothening the pulse-width-modulated modified signal, harmonics otherwise generated by the pulse-width-modulated modified signal will be reduced. Such harmonics could otherwise interfere electromagnetically with the magnetic induction coil during operation. It is an advantage, that in some embodiments, the filter may re-place any shielding needed around the magnetic induction coil in the coupling module. Hereby, the size of the coupling module may be reduced.

In some embodiments, the hearing device comprises a shielding element. In some embodiments, the shielding element has a connection to a ground, such as to a ground potential. A connection to a ground may improve the shielding and ensure that e.g. any electromagnetic interference created by the shield is reduced.

In some embodiments, the shielding element provides a shielding between the behind-the-ear housing module and the magnetic induction coil. In some embodiments the shielding element provides a shielding between electronic components in the coupling module, including any electrical interconnections passing through the coupling module. In some embodiments the shielding element provides a shielding between the behind-the-ear housing module and the magnetic induction coil and between electronic components in the coupling module, including any electrical interconnections passing through the coupling module and the magnetic induction coil.

The shielding element may be an electromagnetic shielding element providing shielding for electromagnetic radiation. In some embodiments, the shielding element ensures that unwanted signals, either from electronic components of the behind-the-ear housing module, such as the signal processor, the magnetic induction control unit, power management unit, etc., and/or from electronic components in the coupling module including any electrical interconnections passing through the coupling module, etc. are reduced, such as suppressed, such as at least partly suppressed, before reaching the magnetic induction coil.

In some embodiments, the shielding element is provided in the coupling module. By providing shielding, such as electromagnetic shielding between the behind-the-ear housing module and the magnetic induction coil, any influence from electronic components in the behind-the-ear housing module may be reduced. Positioning the shielding element in the coupling module, such as in the first coupling part, may be advantageous in reducing electromagnetic noise, such as electromagnetic interference also from components, including wires, which are provided in the behind-the-ear housing module but electrically close to the coupling module.

In some embodiments, the shielding element provides a shielding, such as an electromagnetic shielding, between the magnetic induction coil and further electrical components provided in the coupling module. The shielding element may shield the magnetic induction coil along one side, such as a side towards the behind-the-ear housing module, such as a side towards further electrical components provided in the coupling module, etc.

The shielding element may be any shielding element as normally used for shielding electro magnetic radiation. Typically, the shield comprises a conductive material. In some embodiments, the shielding element comprises a sheet metal, a perforated metal sheet, such as a mesh metal sheet, a metal screen, a metal foam, metal foil, etc. In some embodiments, the shielding element is one of a sheet metal element, a metal screen, a metal foil, or a metal foam. In some embodiments, the shielding element comprises a carrier material, such as a composite material, and a conductive material. In some embodiments, the conductive material is embedded in the carrier material, in some embodiments, the conductive material is provided on a side of the carrier material, such as using printing, deposition, lamination, adhesion, coating, etc. In some embodiments, the carrier material is loaded with metal elements. Typically, the conductive material used includes copper, nickel, iron, chromium, brass, aluminium, silver, stainless steel, metalized plastics, conductive carbon/graphite composites, etc., including any combination or alloys comprising such materials.

In some embodiments, the shielding element is a cylindrically formed shielding element with a longitudinal axis parallel to a longitudinal axis of the magnetic induction coil. In some embodiments, the shielding element is a solid shielding element, such as a solid cylindrically shielding element with at least one open end. In some embodiments, the shielding element is a shielding element having one or more openings, such as a cylindrically shielding element having one or more openings in addition to the at least one open end. In some embodiments, the shielding element is a cylindrically shielding element having a slit in a longitudinal direction and at least one open end. Having a slit in the shielding element ensures that current in the shield may be reduced or substantially eliminated. Thereby, any impact on the magnetic field of the magnetic induction coil will also be reduced.

It is envisaged that the shielding element may have different shapes and forms. It is envisaged that in some embodiments, the shielding element is configured to provide an optimum shielding of the magnetic induction coil along the longitudinal direction, while at least one end face of the magnetic induction coil is not shielded. Particularly, in some embodiments, the magnetic induction coil is configured to communicate with e.g., a hearing device, provided at another side of the head of a user, and the end face of the magnetic induction coil towards the head of the user is left un-shielded to obtain efficient communication through the head of the user.

In some embodiments, the hearing device comprises a filter as described herein. In some embodiment, the hearing device comprises a shielding element as described herein. In some embodiments, the hearing device comprises both a filter and a shielding element as described herein.

In some embodiments, the hearing device comprises an H-bridge and a shielding element and no filter. In some embodiments, the hearing device comprises an H-bridge and a filter and, optionally, also a shielding element.

The present disclosure relates to different aspects including the hearing device described above and in the following, and corresponding hearing devices, binaural hearing devices, systems, methods, devices, uses and/or product means, each yielding one or more of the benefits and advantages described in connection with the first mentioned aspect, and each having one or more embodiments corresponding to the embodiments described in connection with the first mentioned aspect and/or disclosed in the appended claims.

It is also to be understood that the terminology used herein is for purpose of describing particular embodiments only, and is not intended to be limiting. It should be noted that, as used in the specification and the appended claim, the articles "a", "an", and "the" are intended to mean that there are one or more of the elements unless the context explicitly dictates otherwise. Thus, for example, reference to "a unit" or "the unit" may include several devices, and the like. Furthermore, the words “comprising”, “including”, “containing” and similar wordings does not exclude other elements or steps.

BRIEF DESCRIPTIONS OF THE DRAWINGS

Figure 2:
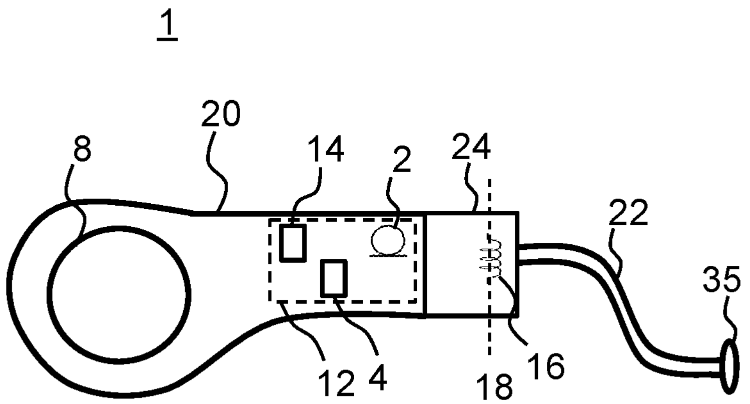
Figure 3A:
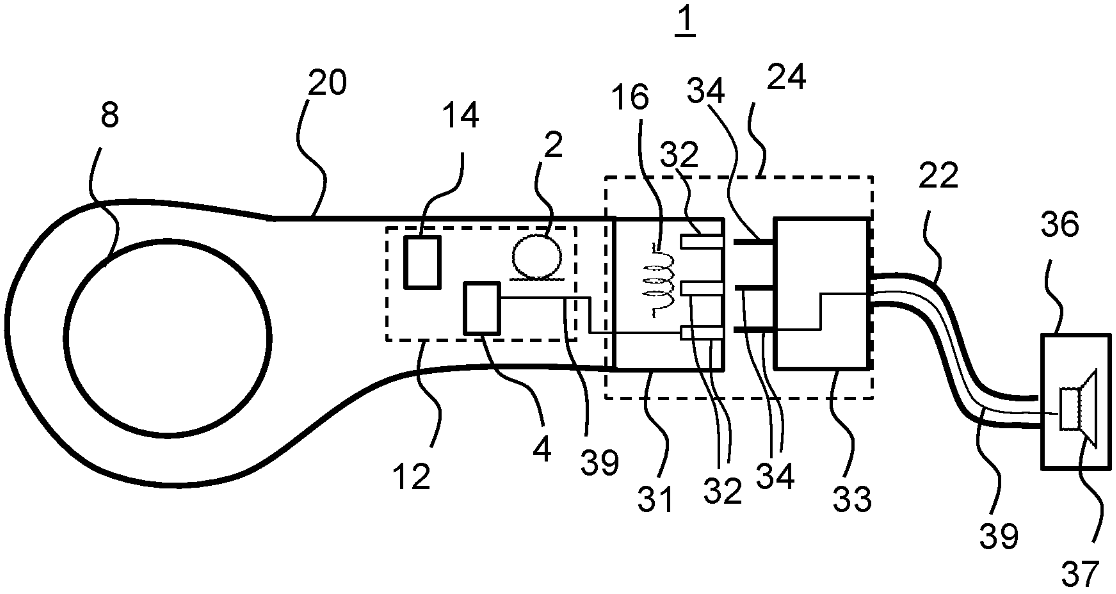
Figure 3B:
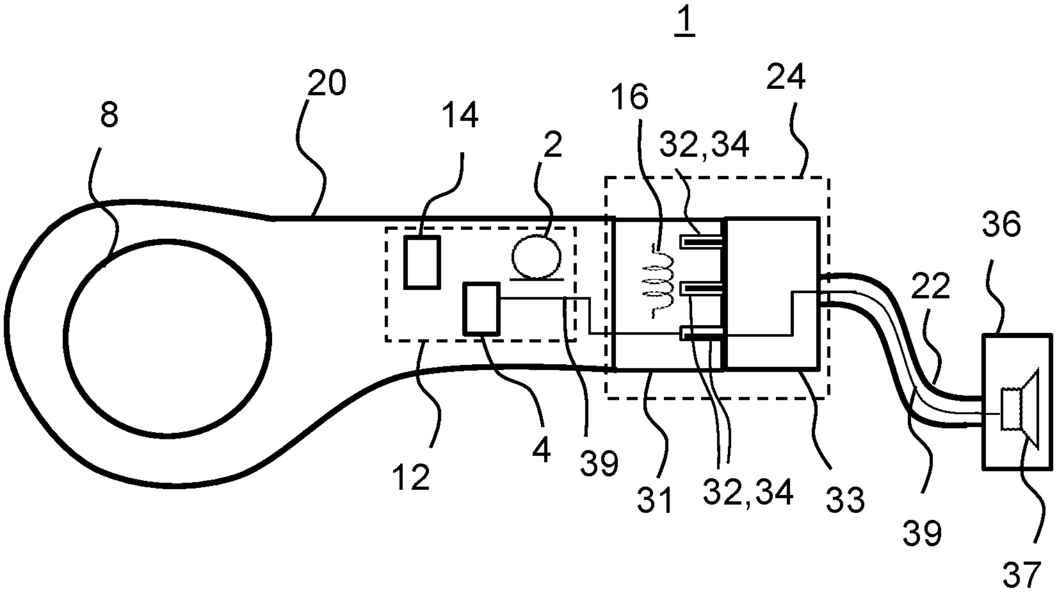
Figure 4:
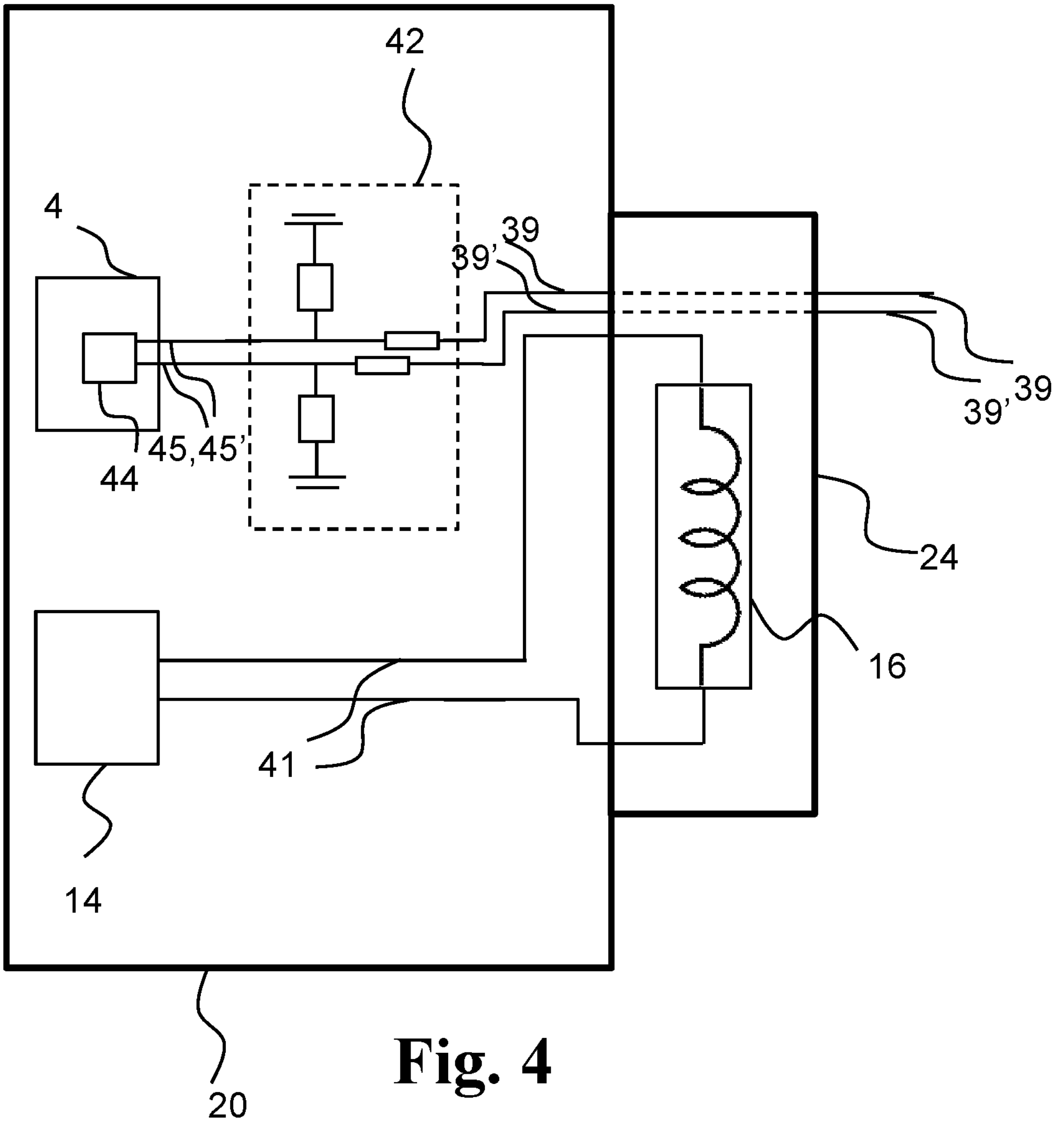

The above and other features and advantages will become readily apparent to those skilled in the art by the following detailed description of exemplary embodiments thereof with reference to the attached drawings, in which:

FIG. 1 schematically illustrates an example of components in a hearing device, FIG. 2 schematically illustrates an example hearing device according to the present disclosure, FIGS. 3*a* and 3*b* show exemplary hearing devices with a coupling module according to the present disclosure, in more detail, FIG. 4 shows diagrammatically a hearing device according to the present disclosure, FIGS. 5*a-e* shows schematically the coupling module including a shielding element.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

A block-diagram of an embodiment of a hearing device 1 is shown in FIG. 1. The hearing device 1 comprises a first transducer, i.e. microphone 2, to generate one or more microphone output signals based on a received an audio signal. The one or more microphone output signals are provided to a signal processor 4 for processing the one or more microphone output signals. A receiver or speaker 6 is connected to an output of the signal processor 4 for converting the output of the signal processor into a signal modified to compensate for a user’s hearing impairment, and provides the modified signal to the speaker 6.

The hearing device signal processor 4 may comprise elements such as an amplifier, a compressor and/or a noise reduction system etc. The hearing device may further have a filter function, such as compensation filter for optimizing the output signal.

The hearing device further comprises a magnetic induction control unit 14 interconnected with magnetic induction antenna 16 such as a magnetic induction coil. The magnetic induction control unit 14 is a wireless communication unit and the magnetic induction control unit 14 and the magnetic induction coil 16 may be configured for wireless data communication using emission and reception of magnetic fields. A wireless communication unit may be implemented as a magnetic induction control unit 14. The hearing device 1 further comprises a power source 8, such as a battery or a rechargeable battery. In some examples, the hearing device furthermore comprises a power management unit 10 for controlling the power provided from the battery 8 to any one or more of the signal processor 4, the receiver, the one or more microphones 2, the magnetic induction control unit, 14. The magnetic induction coil 16 is configured for communication with another electronic device, in some embodiments configured for communication with another hearing device, such as another hearing device located at another ear, typically in a binaural hearing device system.

In some embodiments, the power management unit is, or at least comprises, a power management processor. In some embodiments, the magnetic induction control unit is, or at least comprises, a magnetic induction control processor.

In FIG. 2, a first aspect of this disclosure is shown, in which the hearing device 1 comprises a magnetic induction coil 16 and a magnetic induction control unit 14, the magnetic induction control unit 14 being interconnected with the magnetic induction coil 16. The magnetic induction control unit 14 and the magnetic induction coil 16 are configured for wireless communication. The hearing device 1 comprises a behind-the-ear housing module 20, the behind-the-ear housing module 20 comprising the signal processor 4 for processing received audio signals into a signal modified to compensate for a user’s hearing impairment. The hearing device 1 further comprises a connecting module 22 configured for providing the modified signal to an ear of the user, e.g. to ear canal opening 35, a coupling module 24 interconnecting the behind-the-ear housing module 20 and the connecting module 22.

The magnetic induction control unit 14 is provided in the behind-the-ear housing module 20. The magnetic induction coil 16 is provided in the coupling module 24. The magnetic induction coil 16 has a longitudinal axis 18. Typically, the magnetic induction coil 16 is positioned in the coupling module 24 so that the longitudinal axis 18 of the magnetic induction coil 16 has a direction along an ear-to-ear axis of a user when the hearing device is positioned in the intended operational position at the ear of the user. Hereby, for example, communication with a hearing device comprising a corresponding magnetic induction coil, and being positioned at the other ear of the user, is facilitated. In some embodiments, the coupling module 24 may comprise a carrier substrate, such as a PCB, assisting the positioning of the magnetic induction coil 16 in the coupling module 24 in the desired position.

Electrical components 12 of the behind-the-ear housing module 22 may comprise signal processor 4, magnetic induction control unit 14, one or more microphones 2, etc.

FIGS. 3*a* and 3*b* illustrate the hearing device including the coupling module 24 in more detail. FIG. 3*a* illustrates that the coupling module 24 comprises a first coupling part 31 and a second coupling part 33, the first coupling part 31 being attached to the behind-the-ear housing module 20, and the second coupling part 33 being attached to the connecting module 22. The first coupling part 31 and the second coupling part 33 are being configured to be detachably connected. The first coupling part 31 comprises first electrical connectors 32 and the second coupling part 33 comprises second electrical connectors 34. The first electrical connectors 32 and the second electrical connectors 34 are configured to connect electrically when the first coupling part 31 and the second coupling part 33 are assembled. The first electrical connectors 32 and the second electrical connectors 34 are shown as a plug and socket implementation, but it is envisaged that such connection can be made in any way known to a skilled person.

The first coupling part 31 and the second coupling part 33 may additionally comprise corresponding physical connector parts (not shown) in any known way ensuring a detachable connection between the first coupling part 31 and the second coupling part 33.

It is seen in FIGS. 3*a* and 3*b* that the magnetic induction coil is provided in the first coupling part. As illustrated in FIGS. 3*a* and 3*b*, the hearing device 1 further comprises an in-the-ear module 36. The in-the-ear module 36 is configured to receive the modified signal from the signal processor 4 via the coupling module 24 and the connecting module 22 and the in-the-ear module 36 is attached to the connecting module 22. It is seen that one end of connecting module 22 is attached to the coupling module 24, while another end of the connecting module 22 is attached to the in-the-ear module 36. In some embodiments, the connecting module 22 is fixedly connected with the second coupling part 33.

As illustrated in FIGS. 3*a* and 3*b*, the in-the-ear module 36 comprises at least one electrical component 37, such as a transducer 37, the at least one electrical component 37 having an electrical interconnection 39 with electrical components 12 of the behind-the-ear housing module 22.

The electrical interconnection 39 is provided through the connecting module 22 and through the coupling module 24 to the electrical components 12 of the behind-the-ear housing module 20.

As is seen, FIG. 3*a* illustrates the coupling module 24 in which the first coupling part 31 and the second coupling part 33 are detached. In FIG. 3*b*, the first coupling part 31 and the second coupling part 33 are assembled and there is an electrical connection 39 from the at least one electrical component 37 in the in-the-ear module 36 through the connecting module 22 and the coupling module 24 via first and second electrical connectors 32, 34 to the components 12 of the behind-the-ear housing module; such as for example to the signal processor 4.

FIG. 4 shows diagrammatically a hearing device according to the present disclosure. In FIG. 4, the signal processor 4 and the magnetic induction control unit 14 are illustrated in the behind-the-ear housing module 20. Other components may be present in the behind-the-ear housing module 20, such as e.g. one or more microphones, battery, power management control unit, etc., however not shown for clarity. The magnetic control unit 14 is connected to magnetic induction coil 16 via control lines 41 connecting to either end of the magnetic induction coil 16. The magnetic induction coil 16 is provided in the coupling module 24. A filter 42 is provided in the behind-the-ear housing module 20, the filter 42 being configured to filter signals transmitted from the signal processor, including the modified signal to be provided to the at least one electrical component 37 of the in-the-ear module 36.

The filter 42 may be implemented in any way known to a skilled person. The filter may be a low-pass filter; and the low pass filter may have a cut-off frequency at or below 1 MHz, such as at or below 5 MHz, such as at or below 8 MHz. The filter 42 may be a band pass filter configured to filter out a frequency range around an operational frequency of the magnetic induction coil 16.

The filter may be configured to have an RC factor which is between 10 and 200 to efficiently smoothen the pulse-width modulated signal, e.g. increase the rise/fall time.

Shown schematically in FIG. 4, the hearing device may additionally comprise an H-bridge circuit 44. The H-bridge circuit 44 is provided in the behind-the-ear housing module 20 between the signal processor 4 and the filter 42. As shown, the H-bridge circuit 44 is provided as part of the signal processor 4. However, it is envisaged that the H-bridge circuit may also be provided as a circuit separate from the signal processor. The H-bridge circuit 44 is configured to receive the processed and modified signal and generate a modified signal being a pulse-width-modulated modified signal having a rise time and a fall time. The pulse-width-modulated modified signal is provided or transmitted to the filter 42 via lines 45, 45'.

In some embodiments, the filter 42 is configured to increase the rise time and the fall time of the pulse-width-modulated signal. Thus, the filter 42 may smoothen the pulse-width-modulated signal. Hereby, the modified signal transmitted by interconnecting lines 39, 39' is less likely to produce harmonics, such as harmonics of a frequency likely to interfere with the operation of the magnetic induction coil 16. The modified signal transmitted by interconnecting lines 39, 39' may be a filtered pulse-width-modulated modified signal.

FIGS. 5*a-e* shows schematically the coupling module. As illustrated in FIGS. 5*a-e*, in some embodiments, the coupling module 24 further comprises a shielding element 50. The shielding element 50 has, optionally, a connection to a ground 52, such as to a ground potential 52. It is envisaged that shielding element 50 may be any combination of any of the below suggested or further shielding elements.

It is envisaged that in some embodiments, a filter 42 and a shielding element 50 is provided in the hearing device as herein disclosed. In some embodiments, the hearing device may comprise a shielding element 50 while not comprising a filter 42. In some embodiments filter 42 may be unnecessary due to shielding by shielding element 50.

Figure 5A:
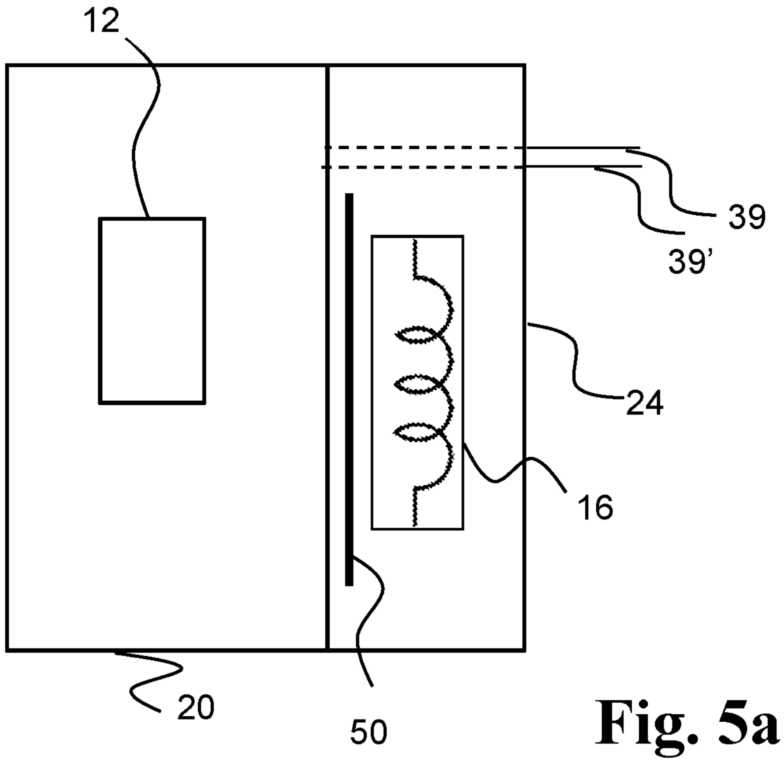

As illustrated, in FIG. 5*a*, in some embodiments, the shielding element 50 provides an electromagnetic shield between the behind-the-ear housing module 20 and the magnetic induction coil 16, such as between electrical components 12 of the behind-the-ear housing module and the magnetic induction coil 16.

Figure 5B:
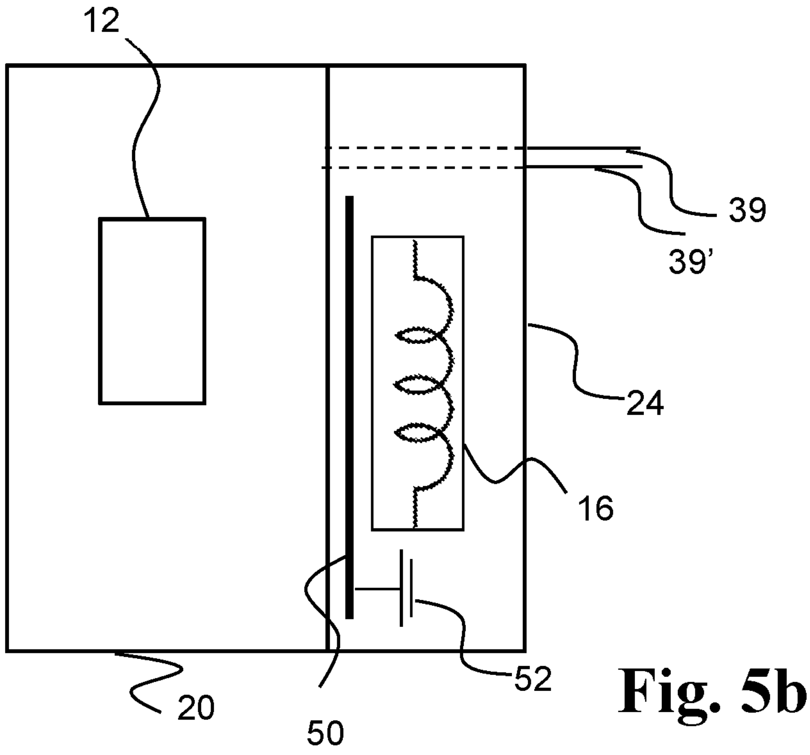

As illustrated in FIG. 5*b*, in some embodiments, the shielding element 50 has a connection to a ground 52, such as to a ground potential 52 of the hearing device. In FIG. 5*b*, the ground 52 is illustrated for the shielding element 50 providing an electromagnetic shield between the behind-the-ear housing module 20 and the magnetic induction coil 16, such as between electrical components 12 of the behind-the-ear housing module and the magnetic induction coil 16. However, it is envisaged that any shielding element as herein disclosed may have a connection to a ground 52.

Figure 5C:
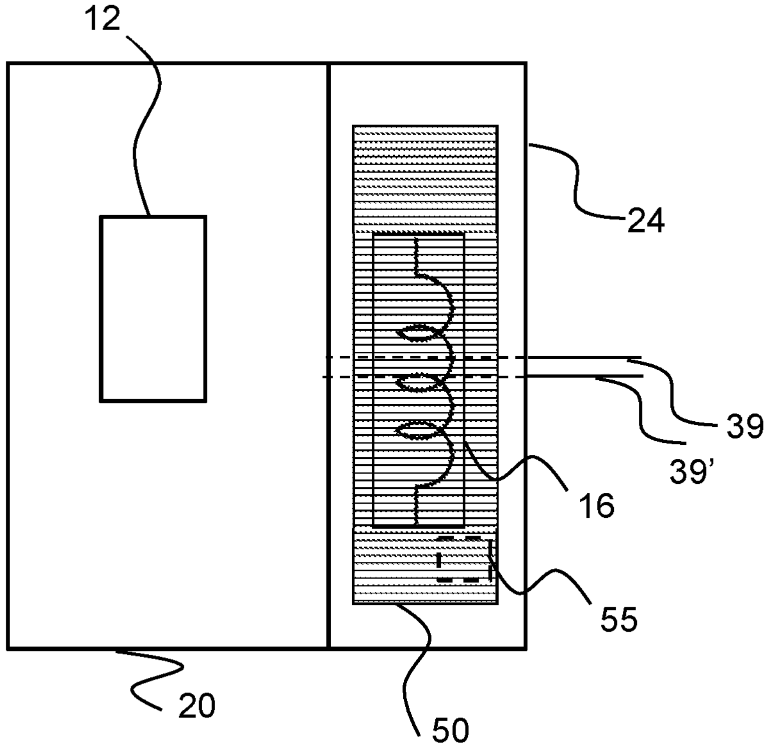

As illustrated in FIG. 5*c*, in some embodiments, the shielding element 50 provides a shielding between interconnecting lines 39, 39' passing through the coupling module 24 and the magnetic induction coil 16. For example, as illustrated, the shielding element is provided between the magnetic induction coil 16 and the interconnecting lines 39, 39'. The magnetic induction coil, the shielding element and the interconnecting lines 39, 39' may be provided in different planes; having the shielding element in a middle plane. It is seen that any further electrical components 55 provided in the coupling element may also be positioned so that they are shielded by shield element 50, e.g. at a same side of the shielding element 50 as any electrical interconnecting lines 39, 39'.

Figure 5D:
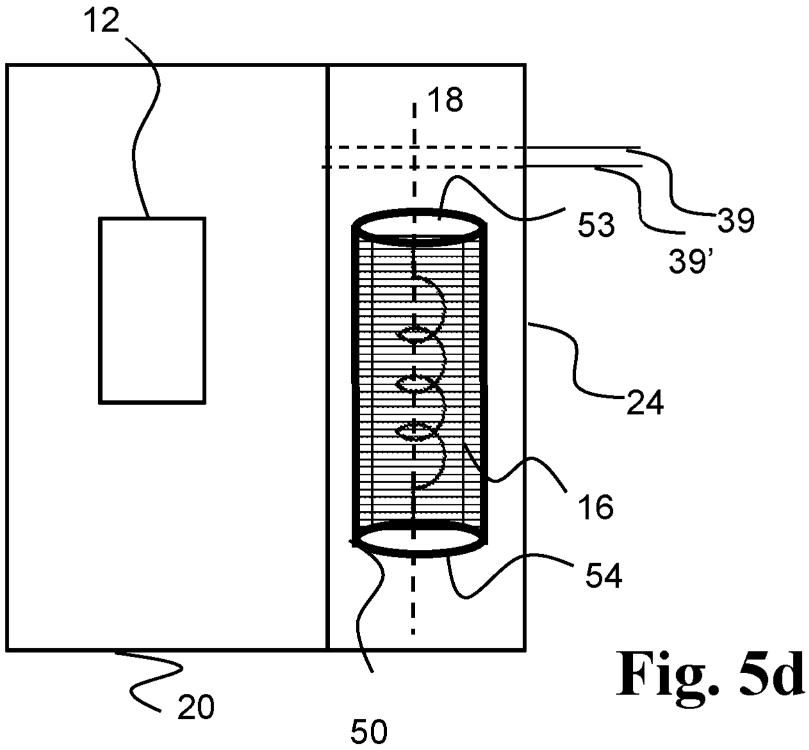

As illustrated in FIG. 5*d*, in some embodiments, the shielding element 50 is a cylindrically formed shielding element 50 with a longitudinal axis parallel to the longitudinal axis 18 of the magnetic induction coil 16. The first cylinder end face 53 and the second cylinder end face 54 are open ended so that the end faces 53, 54 are not covered by the shielding element. The shielding element thereby provides an optimum electromagnetic shield of the magnetic induction coil 16 along the longitudinal direction 18, while at least one end face of the magnetic induction coil is not shielded. Particularly, in some embodiments, the magnetic induction coil 16 is configured to communicate with e.g. a hearing device, provided at another side of the head of a user, and e.g. the first cylinder end face 53, of the cylinder shaped shielding element 50 provided around the magnetic induction coil 16, towards the head of the user is left un-shielded to obtain efficient communication through the head of the user.

Figure 5E:
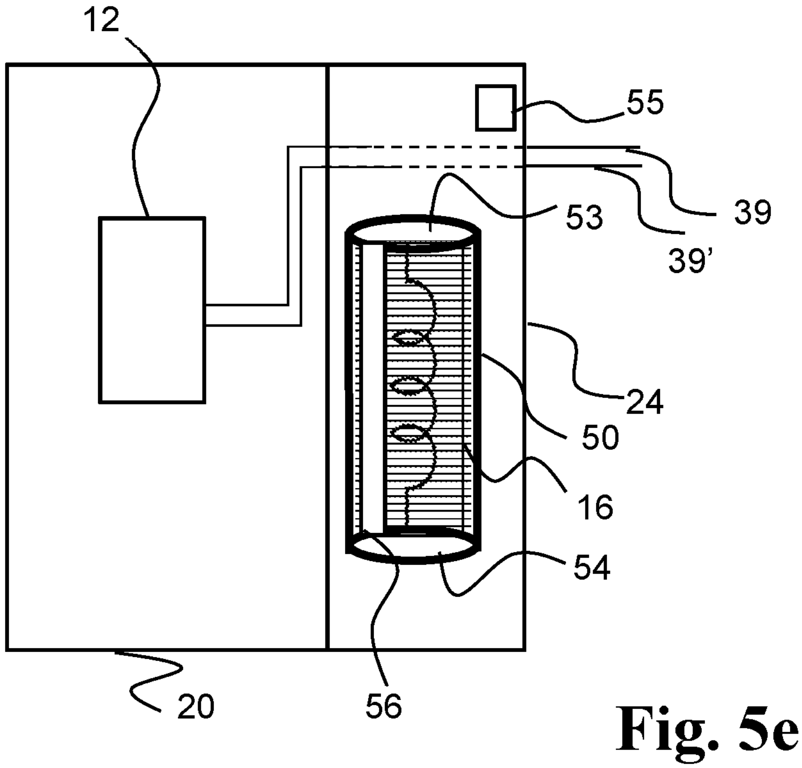

As illustrated in FIG. 5*e*, in some embodiments, the shielding element 50 is a cylindrically formed shielding element 50 with a longitudinal axis parallel to a longitudinal axis 18 of the magnetic induction coil 16, the shielding element 50 further having a slit 56 along the longitudinal axis.

Although particular features have been shown and described, it will be understood that they are not intended to limit the claimed invention, and it will be made obvious to those skilled in the art that various changes and modifications may be made without departing from the spirit and scope of the claimed invention. Thus, the claimed invention may be embodied in other forms and should not be construed as limited to the herein disclosed embodiments. The specification and drawings are, accordingly to be regarded in an illustrative rather than restrictive sense. The claimed invention is intended to cover all alternatives, modifications and equivalents.

REFERENCE NUMERALS

1 hearing device
2 transducer, i.e. microphone
4 signal processor
6 receiver or speaker
8 power source
10 power management unit
12 electrical components of the behind-the-ear housing module
14 magnetic induction control unit.
16 magnetic induction coil/antenna
18 longitudinal axis of the magnetic induction coil
20 behind-the-ear housing module
22 connecting module
24 coupling module
31 first coupling part
32 first coupling part contacts
33 second coupling part
34 second coupling part contacts
35 ear-canal opening
36 in-the-ear module
37 electrical component of the in-the-ear module
39, 39' interconnecting lines
41 coil connecting lines
42 filter
44 H-bridge circuit
45 modified signal
50 shielding element
52 ground
53 first cylinder end face
54 second cylinder end face
55 electrical components provided in the coupling module
56 slit

The invention claimed is:

1. A hearing device comprising:
a magnetic induction coil;
a magnetic induction control unit coupled with the magnetic induction coil, the magnetic induction control unit and the magnetic induction coil being configured for wireless communication;
a behind-the-ear housing module, the behind-the-ear housing module comprising a signal processor configured to process audio signals and to provide an output compensating for a hearing impairment of a user of the hearing device;
a connecting module comprising a wire configured to transmit the output, or an output signal that is based on the output; and
a coupling module connecting the behind-the-ear housing module and the connecting module;
wherein the magnetic induction control unit is in the behind-the-ear housing module, and wherein the magnetic induction coil is in the coupling module, the coupling module comprising an electrical conductor configured to electrically connect the wire of the connecting module with the signal processor.

2. The hearing device according to claim 1, wherein the coupling module comprises a first coupling part and a second coupling part, the first coupling part being attached to the behind-the-ear housing module, and the second coupling part being attached to the connecting module.

3. A hearing device comprising:
a magnetic induction coil;
a magnetic induction control unit coupled with the magnetic induction coil, the magnetic induction control unit and the magnetic induction coil being configured for wireless communication;
a behind-the-ear housing module, the behind-the-ear housing module comprising a signal processor configured to process audio signals and to provide an output compensating for a hearing impairment of a user of the hearing device;
a connecting module configured to transmit the output, or an output signal that is based on the output; and
a coupling module connecting the behind-the-ear housing module and the connecting module;
wherein the magnetic induction control unit is in the behind-the-ear housing module, and wherein the magnetic induction coil is in the coupling module;
wherein the coupling module comprises a first coupling part and a second coupling part, the first coupling part being attached to the behind-the-ear housing module, and the second coupling part being attached to the connecting module; and
wherein the first coupling part and the second coupling part are detachably connected with each other.

4. A hearing device comprising:
a magnetic induction coil;
a magnetic induction control unit coupled with the magnetic induction coil, the magnetic induction control unit and the magnetic induction coil being configured for wireless communication;
a behind-the-ear housing module, the behind-the-ear housing module comprising a signal processor configured to process audio signals and to provide an output compensating for a hearing impairment of a user of the hearing device;

a connecting module configured to transmit the output, or an output signal that is based on the output; and a coupling module connecting the behind-the-ear housing module and the connecting module;

wherein the magnetic induction control unit is in the behind-the-ear housing module, and wherein the magnetic induction coil is in the coupling module;

wherein the coupling module comprises a first coupling part and a second coupling part, the first coupling part being attached to the behind-the-ear housing module, and the second coupling part being attached to the connecting module; and wherein the magnetic induction coil is in the first coupling part.

5. The hearing device according to claim 1, further comprising an in-the-ear module, the in-the-ear module configured to receive the output or the output signal via the coupling module and the connecting module, wherein the in-the-ear module is attached to the connecting module.

6. A hearing device comprising:

a magnetic induction coil;

a magnetic induction control unit coupled with the magnetic induction coil, the magnetic induction control unit and the magnetic induction coil being configured for wireless communication;

a behind-the-ear housing module, the behind-the-ear housing module comprising a signal processor configured to process audio signals and to provide an output compensating for a hearing impairment of a user of the hearing device;

a connecting module configured to transmit the output, or an output signal that is based on the output; and a coupling module connecting the behind-the-ear housing module and the connecting module;

wherein the magnetic induction control unit is in the behind-the-ear housing module, and wherein the magnetic induction coil is in the coupling module;

wherein the hearing device further comprises an in-the-ear module, the in-the-ear module configured to receive the output or the output signal via the coupling module and the connecting module, wherein the in-the-ear module is attached to the connecting module; and wherein the in-the-ear module comprises at least one electrical component, the at least one electrical component having an electrical interconnection with an electrical component of the behind-the-ear housing module.

7. The hearing device according to claim 6, wherein the electrical interconnection extends through the connecting module and through the coupling module to reach the electrical component of the behind-the-ear housing module.

8. The hearing device according to claim 6, wherein the behind-the-ear housing module comprises a filter configured to perform signal filtering to obtain the output signal.

9. The hearing device according to claim 8, wherein the electrical interconnection comprises an H-bridge circuit, the H-bridge circuit being in the behind-the-ear housing module between the signal processor and the filter, the H-bridge circuit being configured to receive the output and to generate a pulse-width-modulated signal having a rise time and a fall time, wherein the filter is configured to increase the rise time and the fall time of the pulse-width-modulated signal.

10. The hearing device according to claim 8, wherein the filter is configured to have an RC factor, which is between 10 and 200.

11. The hearing device according to claim 8, wherein the filter is a low-pass filter, the low pass filter having a cut-off frequency at or below 8 MHz.

12. The hearing device according to claim 8, wherein the filter is a band pass filter configured to filter out a frequency range around an operational frequency of the magnetic induction coil.

13. The hearing device according to claim 1, wherein the coupling module comprises a shielding element.

14. The hearing device according to claim 13, wherein the shielding element has a connection to a ground.

15. The hearing device according to claim 13, wherein the shielding element is configured to provide a shielding between the behind-the-ear housing module and the magnetic induction coil.

16. The hearing device according to claim 13, wherein the shielding element is configured to provide a shielding between the magnetic induction coil and an electrical component in the coupling module.

17. The hearing device according to claim 13, wherein the shielding element is a cylindrically formed shielding element with a longitudinal axis parallel to a longitudinal axis of the magnetic induction coil.

* * * * *